United States Patent [19]

Suzuki et al.

[11] 4,031,287

[45] June 21, 1977

[54] SELF-BONDING INSULATED WIRE

[75] Inventors: Kazuo Suzuki; Yoshiaki Hayashi; Seiichi Nagamine, all of Ootsu, Japan

[73] Assignee: Kanegafuchi Chemical Industries Co., Ltd., Osaka, Japan

[22] Filed: Apr. 17, 1975

[21] Appl. No.: 569,330

Related U.S. Application Data

[63] Continuation-in-part of Ser. No. 349,885, April 10, 1973, abandoned.

[30] Foreign Application Priority Data

Apr. 13, 1972 Japan .............................. 47-37529

[52] U.S. Cl. ................................ 428/379; 427/302; 427/388 R; 428/375; 428/458; 428/474; 428/480; 428/906

[51] Int. Cl.[2] ...................... B32B 15/00; B05D 3/02

[58] Field of Search .......... 428/375, 379, 344, 458, 428/474, 482, 906; 427/177, 388, 302, 322, 117, 386; 260/830 P, 836–837, 857 PE, 47 EP, 78.4 EP, 75 EP; 174/110 SR, 110 D, 110 E

[56] References Cited

UNITED STATES PATENTS

| | | | |
|---|---|---|---|
| 2,324,483 | 7/1943 | Castan | 260/47 |
| 2,348,536 | 5/1944 | Gordon | 427/117 X |
| 3,027,279 | 3/1962 | Kurka et al. | 428/379 X |
| 3,214,408 | 10/1965 | Rosenberg | 260/47 |
| 3,220,882 | 11/1965 | Lavin et al. | 428/383 |
| 3,354,127 | 11/1967 | Hill et al. | 260/78 |
| 3,361,593 | 1/1968 | Sattler et al. | 428/383 |
| 3,366,603 | 1/1968 | Klaus et al. | 260/47 |
| 3,516,858 | 6/1970 | Fitzhugh et al. | 428/383 |
| 3,536,780 | 10/1970 | Schaaf et al. | 260/857 |
| 3,639,655 | 2/1972 | Jones | 260/47 C |
| 3,763,097 | 10/1973 | Edelman | 260/47 |
| 3,837,981 | 9/1974 | Flint | 428/375 |

FOREIGN PATENTS OR APPLICATIONS

| | | | |
|---|---|---|---|
| 1,087,867 | 10/1967 | United Kingdom | 428/375 |

*Primary Examiner*—P.E. Willis, Jr.
*Attorney, Agent, or Firm*—Barry Kramer

[57] ABSTRACT

A self-bonding insulated wire which comprises an electroconductive wire and a varnish composition containing 100 parts by weight of a copolyamide and 10 to 25 parts by weight of a thermoplastic linear polyhydroxypolyetherester resin coated thereon, the insulated wire being useful for the manufacture of a deflecting coil which is hardly deformed on heating.

10 Claims, No Drawings

SELF-BONDING INSULATED WIRE

This application is a continuation-in-part application of our copending application Ser. No. 349,885, filed Apr. 10, 1973, now abandoned.

The present invention relates to a self-bonding insulated wire. More particularly, it relates to a self-bonding insulated wire suitable for the manufacture of a deflecting coil, which is hardly deformed on heating.

Hitherto, a deflecting coil for a television has been manufactured by applying an electric current to a self-bonding insulated wire for heating. With the increase of a deflecting angle, a demand has arisen on a deflecting coil which is hardly deformed on heating. A conventional insulated wire using polyvinyl butyral for the adhesive layer can not meet the said demand.

As the result of various studies, it has been found that an insulated wire using a varnish composition comprising a copolyamide and a thermoplastic linear polyhydroxypolyetherester resin for the adhesive layer does not produce any bobbin adhesion and realizes a high adhesion strength. It has also been found that a deflecting coil manufactured by the use of such insulated wire is hardly deformed on heating. The present invention is based on these findings.

According to the present invention, there is provided a self-bonding insulated wire which comprises a conductive wire and a varnish composition containing 100 parts by weight of a copolyamide and 10 to 25 parts by weight of a thermoplastic linear polyhydroxypolyetherester resin coated thereon.

As the copolyamide, there may be used any one prepared by polymerizing two or more kinds of the monomeric components conventionally employed for the production of known polyamides in a per se conventional procedure, provided that it has a melting point of from about 110° to 160° C. For obtaining such copolyamide, the kinds and amounts of the monomeric components to be polymerized can be readily selected by those skilled in the art on the basis of the trial-and-error experiments. Examples of the monomeric components are -caprolactam, ω-laurolactam, ethylenediammonium adiptate, tetramethylenediammonium adipate, tetramethylenediammonium pimelate, hexamethylenediammonium adipate, hexamethylenediammonium sebacate, etc. Among them, particularly preferred are ε-caprolactam, ω-laueslactam, hexamethylenediammonium adipate and hexamethylenediammonium sebacate.

The polymerization of these monomeric components may be effected by a per se conventional procedure; e.g. heating them in the presence or absence of water, an alkanol, an amine, an organic carboxylic acid, an alkali metal or the like at a temperature of from about 200° to 300° C under an atmospheric or elevated pressure. For instance, the copolyamide prepared by polymerization of ω-lauralactam, ε-caprolactam and hexamethylenediammonium adipate in a proportion of 40 : 30 : 30 by weight shows a melting point of about 126° C. Further, for instance, the copolyamide prepared by polymerization of ε-caprolactam, hexamethylenediammonium adipate and hexamethylenediammonium sebacate in a proportion of 27 : 25 : 48 by weight shows a melting point of about 149° C. These and other copolyamides utilizable in this invention are known and described, for instance, in Japanese Patent Publication No. 19868/1969.

As the thermoplastic liner polyhydroxypolyetherester resin, there may be used a thermoplastic linear resin obtainable by the reaction between a methyl-substituted type diepoxide and a divalent carboxylic acid in an approximately equimolar amount, having a weight average molecular weight of about 40,000 to 50,000 and possessing a self-film forming property. In the said reaction, there is formed a tertiary hydroxyl group, which is inactive to the dehydrative esterification with a carboxylic acid. Thus, the methyl-substituted type diepoxide always behaves as a glycol so that a linear high molecular substance is formed as the reaction product. When the diepoxide is not of the methyl-substituted type, there is formed a secondary hydroxyl group which is active to the dehydrative esterification, and a three dimensional structure is produced with gel formation. Examples of the methyl-susbstituted type diepoxide include the reaction product of bisphenol A with β-methylepichlorohydrin in the presence of an alkali hydroxide (e.g. sodium hydroxide), which is known under the trade name "Bisphenol Type Epiclon" (Dainippon Ink & Chemicals Inc.). As the divalent carboxylic acid, there may be exemplified isophthalic acid, terephthalic acid, adipic acid, etc.

The thermoplastic linea polyhydroxypolyetherester resin is known and described, for instance, in the Japanese Monthly Journal "Kobunshi Kako" (Processing of Polymers), No. 11, pages 5 – 13 (1970). Also, it is commercially available under the trade name "Etherester Type Epiclon" (Dainippon Ink & Chemicals Inc.).

In case of using bisphenol A and β-methylepichlorohydrin for production of the methyl-substituted type diepoxide and of using adipic acid as the divalent carboxylic acid, the conversions with them through the methyl-susbstituted type diepoxide into the thermoplastic linear polyhydroxypolyetherester resin are representable by the following formulae:

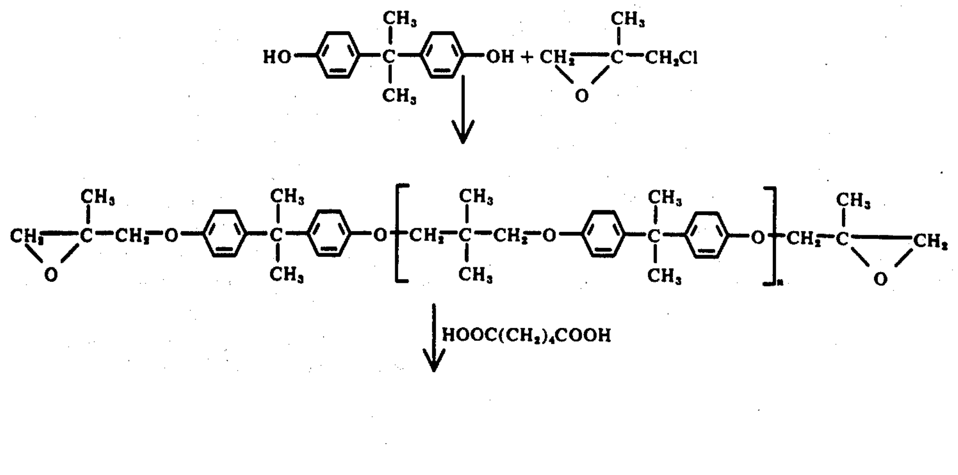

-continued

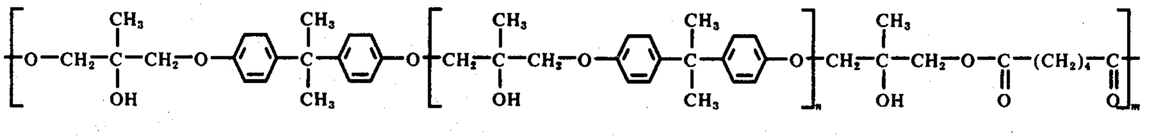

The thermoplastic linear polyhydroxypolyetherester resin is to be used in an amount of 10 to 25 parts by weight to 100 parts by weight of the copolyamide. When the amount is less than 10 parts by weight, bobbin adhesion may be produced. When more than 25 parts by weight, the compatibility of the components is bad so that the insulated wire coated thereby is inferior in gloss and appearance.

The copolyamide and the thermoplastic linear polyhydroxypolyetherester resin are respectively dissolved in an appropriate solvent such as m-cresol, and the resulting solutions are mixed together to make a varnish composition.

The varnish composition is applied on an electroconductive wire such as copper wire, which is usually pre-coated with an enamel of synthetic resin (e.g. polyester, polyesterimide, polyamideimide, polyimide or polyvinyl formal), by a per se conventional procedure and then baked in a furnace maintained at a temperature of from about 250° to 400° C to give a self-bonding insulated wire.

The self-bonding insulated wire may be formed in a coil by a per se conventional procedure; e.g. applying an electric current thereto for heating.

As stated above, the thus obtained coil is quite useful as a deflecting coil for a television, because it is hardly deformed on heating.

Practical and presently preferred embodiments of the present invention are illustratively shown in the following Examples wherein parts are by weight.

EXAMPLE 1

A copolyamide obtained by polymerization of ω-lauralactam, ε-caprolactam and hexamethylenediammonium adipate in a proportion of 40 : 30 : 30 by weight and having a melting point of about 126° C (100 parts) and a thermoplastic linear polyhydroxypolyetherester resin ("Etherester Type Epiclon H-330" manufactured by Dainippon Ink & Chemicals Inc.) (15 parts) were respectively dissolved in m-cresol, and the resultant solutions were mixed together to make a varnish composition. The varnish composition was applied on a polyester enamelled copper wire (electro-conductive material: 0.4 mm in diameter), and the wire was passed through a furnace of 300° C at a linear speed of 15 /minute for baking to obtain a self-bonding insulated wire. The insulated wire was allowed to stand in a constant temperature bath at 40° C for 1 week but any bobbin adhesion was not produced.

Two of the said insulated wire were twisted three times under a tension of 350 g to make a 3 cm of the twisted portion. The resulting twisted wire was kept in a constant temperature bath at 120° C for 10 minutes. After taking out from the bath, the twisted wire was cooled to room temperature, cut and subjected to tensile test. The adhesion strength was 745 g.

A deflecting coil formed by applying an electric current to the insulated wire for heating was kept in a constant temperature bath at 90° C for 1 hour. The deformation was 0.15 mm.

Polyvinyl butyral resin was dissolved in m-cresol to make a varnish composition. The varnish composition was applied on a polyester enamelled copper wire (electro-conductive material: 0.4 mm in diameter), and the wire was passed through a furnace of 300° C at a linear speed of 15 m/minute for baking to obtain a self-bonding insulated wire.

The insulated wire was subjected to various tests as above. Any bobbin adhesion was not produced. The adhesion strength was 670 g. The deformation of the deflecting coil formed by the use of the insulated wire due to heat was 4.20 mm.

EXAMPLE 2

As in Example 1 but using 10 and 25 parts of the thermoplastic linear polyhydroxypolyetherester resin, there were obtained self-bonding insulated wires, which showed no bobbin adhesion and gave respectively 720 g and 715 g in adhesion strength. The deformations of the deflecting coils formed by the use of them were respectively 0.20 mm and 0.30 mm.

EXAMPLE 3

A copolyamide obtained by polymerization of ε-caprolactam, hexamethylenediammonium adipate and hexamethylenediammonium sebacate in a proportion of 27 : 25 : 48 by weight and having a melting point of about 149° C (100 parts) and a thermoplastic linear polyhydroxypolyetherester resin ("Etherester Type Epiclon H-330") (20 parts) were respectively dissolved in m-cresol, and the resultant solutions were mixed together to make a varnish composition. The varnish composition was applied on a polyester enamelled copper wire (electro-conductive material: 0.4 mm in diameter), and the wire was passed through a furnace of 300° C at a linear speed of 15 m/minute for baking to obtain a self-bonding insulated wire. The insulated wire was allowed to stand in a constant temperature bath at 40° C for 1 week but any bobbin adhesion was not produced.

Two of the said insulated wire were twisted three times under a tension of 350 g to make a 3 cm of the twisted portion. The resulting twisted wire was kept in a constant temperature bath at 160° C for 10 minutes. After taking out from the bath, the twisted wire was cooled to room temperature, cut and subjected to tensile test. The adhesion strength was 760 g.

A deflecting coil formed by applying an electric current to the insulated wire for heating was kept in a constant temperature bath at 90° C for 1 hour. The deformation was 0.65 mm.

What is claimed is:

1. A self-bonding insulated wire which comprises an electro-conductive wire and a varnish composition containing 100 parts by weight of a copolyamide and 10 to 25 parts by weight of a thermoplastic linear polyhydroxypolyetherester resin coated thereon.

2. The self-bonding insulated wire according to claim 1, wherein the copolyamide has a melting point of from about 110° to 160° C.

3. The self-bonding insulated wire according to claim 2, wherein the copolyamide is prepared by polymerizing two or more members selected from the group consisting of ϵ-caprolactam, ω-laurolactam, ethylenediammonium adipate, tetramethylenediammonium adipate, tetramethylenediammonium pimelate, hexamethylenediammonium adipate and hexamethylenediammonium sebacate.

4. The self-bonding insulated wire according to claim 3, wherein the copolyamide is prepared by polymerizing two or more members selected from the group consisting of ϵ-caprolactam, ω-laurolactam, hexamethylenediammonium adipate and hexamethylenediammonium sebacate.

5. The self-bonding insulated wire according to claim 4, wherein the copolyamide is prepared by polymerizing ω-laurolactam, ϵ-caprolactam and hexamethylenediammonium adipate.

6. The self-bonding insulated wire according to claim 4, wherein the copolyamide is prepared by polymerizing, ϵ-caprolactam, hexamethylenediammonium adipate and hexamethylenediammonium sebacate.

7. The self-bonding insulated wire according to claim 1, wherein the thermoplastic linear polyhydroxypolyetherester resin is prepared by reacting a methyl-substituted type diepoxide and a divalent carboxylic acid in an approximately equimolar amount, has a weight average molecular weight of about 40,000 to 50,000 and possesses a self-film forming property.

8. The self-bonding insulated wire according to claim 7, wherein the methyl-substituted type diepoxide is a reaction product of bisphenol A with β-methylepichlorohydrin.

9. The self-bonding insulated wire according to claim 7, wherein the divalent carboxylic acid is a member selected from the group consisting of isophthalic acid, terephthalic acid and adipic acid.

10. A process for manufacturing a self-bonding insulated wire which comprises applying a varnish composition containing 100 parts by weight of a copolyamide and 10 to 25 parts by weight of a thermoplastic linear polyhydroxypolyetherester resin in a solvent on an electroconductive wire and baking the wire at a temperature of about 250° to 400° C.

* * * * *